(12) United States Patent
Koziol et al.

(10) Patent No.: US 12,555,164 B2
(45) Date of Patent: *Feb. 17, 2026

(54) DATA DISTRIBUTION ARCHITECTURE

(71) Applicant: Chicago Mercantile Exchange Inc., Chicago, IL (US)

(72) Inventors: Arkadiusz Koziol, Glenview, IL (US); Priteshkumar Soni, Naperville, IL (US); Melissa Ann Jenner, Naperville, IL (US); Baris Mestanogullari, Downers Grove, IL (US); Pearce Peck-Walden, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/826,840

(22) Filed: Sep. 6, 2024

(65) Prior Publication Data
US 2024/0428335 A1    Dec. 26, 2024

Related U.S. Application Data

(63) Continuation of application No. 18/242,674, filed on Sep. 6, 2023, now Pat. No. 12,112,377, which is a
(Continued)

(51) Int. Cl.
*G06Q 40/04*    (2012.01)
*G06F 16/23*    (2019.01)
(Continued)

(52) U.S. Cl.
CPC ......... *G06Q 40/04* (2013.01); *G06F 16/2379* (2019.01); *G06Q 30/0201* (2013.01); *H04L 67/10* (2013.01)

(58) Field of Classification Search
CPC .................. G06Q 40/04; G06Q 30/0201; G06F 16/2379; H04L 67/10
See application file for complete search history.

(56) References Cited

U.S. PATENT DOCUMENTS 10,326,862 B2    6/2019  Bonig
10,748,210 B2    8/2020  Bonig
(Continued)

OTHER PUBLICATIONS

"Drop Copy Recommendations", Futures Industry Association, 8 pages, Sep. 2013.
(Continued)

*Primary Examiner* — Elda G Milef
(74) *Attorney, Agent, or Firm* — Lempia Summerfield Katz LLC

(57) ABSTRACT

Disclosed are a system and method, also referred to herein as an architecture, for efficiently communicating a high volume of data from a server over an electronic communications network to geographically disperse recipients, where one or more of those recipients may receive a customized version of that data, e.g., content, timing and/or form. As the data is generated, timing information and/or changes to information regarding customizations is incorporated forming a data stream which is communicated to local data publishers ("LDP's"). Upon receipt, the LDP's extract the data, customization, or timing information and act accordingly when transmitting the received data to the recipients. Customization is applied to update local control databases which specify the customizations for subsequently received data before transmission. By acting on the messages in real time, e.g., as they are received, the LDP's, even if they don't receive the messages at the same time, then perform the same functions in the same relative order relative to the data stream.

33 Claims, 6 Drawing Sheets

Related U.S. Application Data continuation of application No. 18/076,621, filed on Dec. 7, 2022, now Pat. No. 11,790,450, which is a continuation of application No. 17/154,265, filed on Jan. 21, 2021, now Pat. No. 11,551,300.

(51) Int. Cl.
*G06Q 30/0201* (2023.01)
*H04L 67/10* (2022.01)

(56) References Cited

U.S. PATENT DOCUMENTS

| | | |
|---|---|---|
| 2014/0359036 A1 | 12/2014 | Blakers |
| 2015/0127516 A1 | 5/2015 | Studnitzer et al. |
| 2018/0047100 A1 | 2/2018 | Bonig |
| 2018/0183901 A1 | 6/2018 | Lariviere |
| 2019/0073719 A1 | 3/2019 | Parsons et al. |
| 2019/0377810 A1 | 12/2019 | Soni |
| 2020/0402169 A1 | 12/2020 | Bonig |
| 2020/0402170 A1 | 12/2020 | Konduru |
| 2021/0118027 A1 | 4/2021 | Atkinson et al. |

OTHER PUBLICATIONS

"Fan-out (software)", Wikipedia, 1 page, https://en.wikipedia.org/wiki/Fan-out, Aug. 2, 2020.

"Supercharge your data distribution with TIBCO FTL®", TIBCO, 6 pages, https://www.tibco.com/products/tibco-ftl, 2021.

"TIBCO FTL", TIBCO, 3 pages, Jun. 9, 2016.

Cao, B.B., "Hot Events Detection of Stock Market Based on Time Series Data of Stock and Text Data of Network Public Opinion", Journal of Data Analysis and Information Processing, pp. 174-189, Sep. 30, 2019.

Extended European Search Report, from EP Application No. 21208540.0, Apr. 7, 2022, EP.

Miles et al., "A Cloud-Native Globally Distributed Financial Exchange Simulator for Studying Real-World Trading-Latency Issues At Planetary Scale", Dept. of Computer Science, University of Bristol, Sep. 9, 2018.

600

DATA DISTRIBUTION ARCHITECTURE

RELATED APPLICATIONS

This application is a continuation under 37 C.F.R. § 1.53(b) of U.S. patent application Ser. No. 18/242,674 filed Sep. 6, 2024, now U.S. Pat. No. 12,112,377, which is a continuation under 37 C.F.R. § 1.53(b) of U.S. patent application Ser. No. 18/076,621 filed Dec. 7, 2022, now U.S. Pat. No. 11,790,450, which is a continuation under 37 C.F.R. § 1.53(b) of U.S. patent application Ser. No. 17/154,265 filed Jan. 21, 2021 now U.S. Pat. No. 11,551,300, the entire disclosures of which are hereby incorporated by reference.

BACKGROUND

An electronic communications network interconnects one or more computers so that they may communicate, e.g., by sending electronic messages, data packets, etc., with one another, whether they are in the same room, building or geographic region (such as a Local Area Network or LAN) or in different geographic regions, e.g., across the country or around the globe from each other (such as a Wide Area Network or WAN). Generally, a network is series of points or nodes interconnected by communications paths. Networks can interconnect with other networks and can contain sub-networks. A node is a connection point, either a redistribution point or an end point, for data transmissions generated between the computers which are connected to the network. In general, a node acting as a redistribution point has a programmed or engineered capability to recognize and process or forward transmissions to other nodes. The nodes can be computer workstations, servers, bridges or other devices but typically, these nodes are routers and/or switches. A router is a device or, in some cases, software in a computer, that interconnects at least two networks or sub-networks and determines the next network node to which a piece of data (also referred to as a "packet" in the Internet context) should be forwarded toward its destination. User devices, such as computer devices, servers, etc., connect to the end points of the network, also referred to as points of presence, so as to be able to transmit or receive communications therebetween via the network.

The various communications paths of a network, such as the Internet, can be implemented using coaxial cable, fiber optic cable, telephone cable, leased telephone lines such as T1 lines, satellite links, microwave links or other wired or wireless electronic communications media/technology as is known in the art. The hardware and software which allows the network to function is known as the network "infrastructure." A network can also be characterized by the type of data it carries (voice, data, or both) or by the network protocol used to facilitate communications over the network's physical infrastructure, e.g., Ethernet, TCP/IP, etc.

The Internet, in particular, is a publicly accessible worldwide wide area network which primarily uses the Transport Control Protocol and Internet Protocol ("TCP/IP") to permit the exchange of information. At a higher level, the Internet supports several applications protocols including the Hypertext Transfer Protocol ("HTTP") for facilitating the exchange of HTML/World Wide Web ("WWW") content, File Transfer Protocol ("FTP") for the exchange of data files, electronic mail exchange protocols, Telnet for remote computer access and Usenet for the collaborative sharing and distribution of information. Another application protocol used by the disclosed embodiments is the Financial Information exchange ("FIX") protocol. Private entities may operate their own wide area networks, entirely separate from or incorporating, at least in part, the Internet.

Logically, a wide area network which services a large geographic area, such as the Internet, can be thought of as a web of intermediate network nodes and communications paths interconnecting those network nodes which provide multiple data transmission routes from any given point to any other given point on the network (i.e. between any two computers connected to the network). Physically, a wide area network can also be thought of as a collection of interconnected sub-networks wherein each sub-network contains a portion of the intermediate network nodes and communications paths.

The division of a wide area network, such as the Internet, into sub-networks is typically geographically based, but can also be based on other factors such as resource limitations and resource demands. For example, a particular city may be serviced by one or more sub-networks provided and maintained by one or more providers, such as competing Internet Service Providers ("ISP's"), to support the service and bandwidth demands of the users, e.g. their client and server devices, physically located in that region. The subnetworks of the wide area network may themselves be interconnected using high speed/high bandwidth "backbone" connections which are typically provided and maintained by large telecommunications operators but may also be operated by private entities.

Generally, within each subnetwork, a multitude of lower performance, e.g., lower bandwidth and/or lower transmission speed (higher latency), and therefore likely lower cost, interconnections are used to interconnect the nodes of the subnetwork as well as to connect customer/client devices therewith via the end points/points of presence. In contrast, the higher performance, e.g., higher bandwidth and/or higher transmission speed (lower latency) backbone, and therefore likely higher cost, interconnections are typically used to interconnect one subnetwork with another. That is, as with all economies of scale, high performance, e.g., high bandwidth and/or high speed, interconnections may be more difficult to implement and therefore rarer and more expensive than low performance, e.g., low bandwidth and/or low speed connections, and are therefore typically only implemented where they provide the sufficient return on investment. It will be appreciated, that even as technology progresses, newer and higher bandwidth/speed (lower latency) technologies will remain more costly than relatively lower bandwidth/speed (higher latency) technologies. Accordingly, it will be further appreciated that while these "costs" may be relative, i.e., regardless of the actual bandwidth or speed capabilities, a connection having a particular bandwidth and/or transmission speed capability will typically be more expensive than a connection having a relatively lower bandwidth and/or lower transmission speed capability, and communication between devices on the same sub-network can be expected to be less expensive relative to the cost of communications between devices connected to different sub-networks, particularly between those serving different geographic regions.

For low volume communications, these costs may be negligible and generally incorporated into the fees that customers generally pay for access to the entire wide area network, albeit typically subject to limitations such as bandwidth or speed caps. However, those users which need to send a high volume of data and/or low latency data over the wide area network may incur additional costs, particularly when sending a large volume of low latency data from one sub-network to another, e.g., from one geographic region to another. For example, such users may need to pay surcharges for excessive bandwidth consumption of low latency connections, e.g., to avoid data caps or bandwidth/speed throttling, or purchase, lease or otherwise procure access to exclusive, or substantially exclusive, network interconnections.

Accordingly, for those high volume customers, it is desirable to communicate data as efficiently as possible so as to minimize the cost thereof.

DETAILED DESCRIPTION

Figure 1:
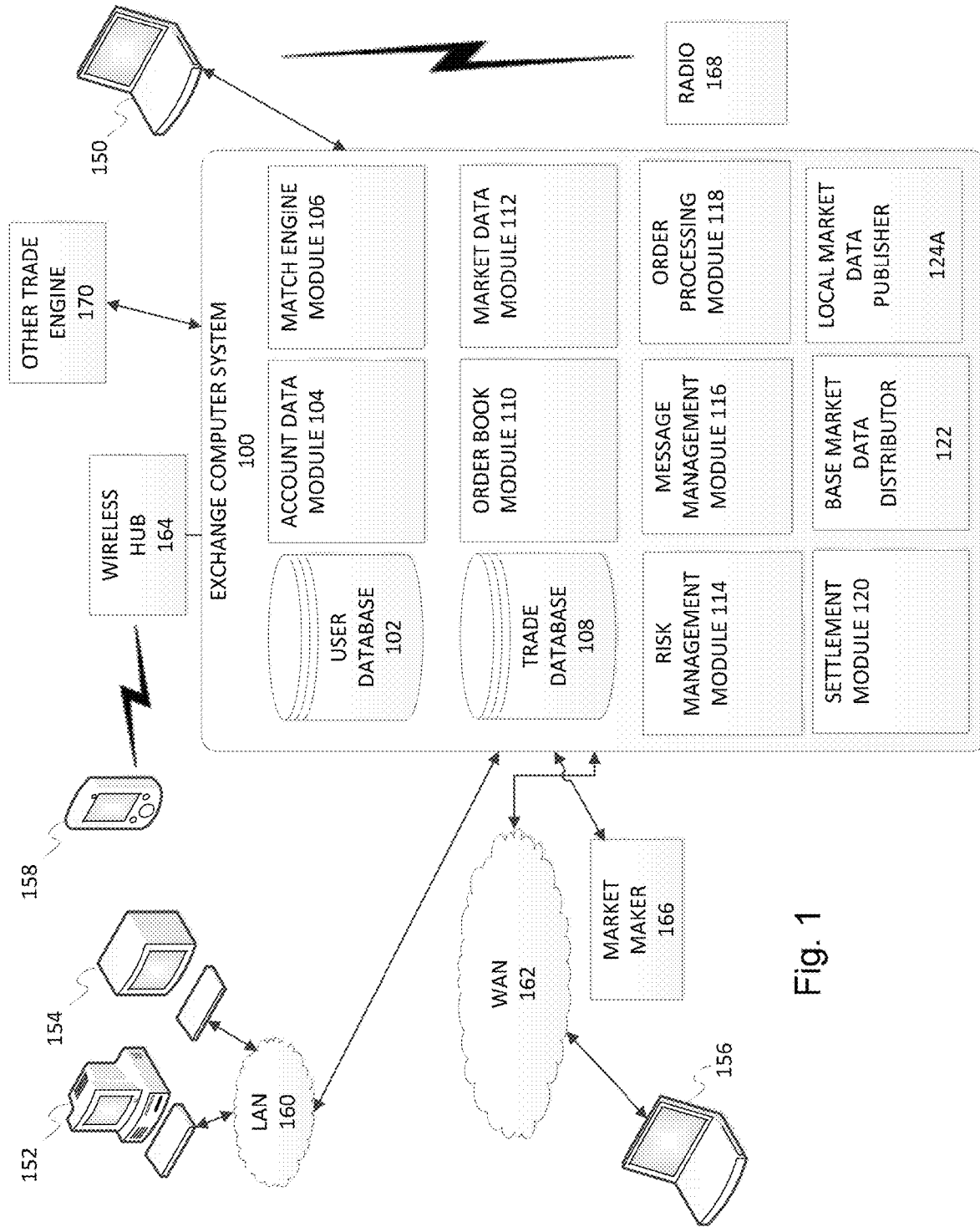
FIG. 1 depicts a computer network system, according to some embodiments.

The disclosed embodiments relate to a system and method, also referred to herein as an architecture, for efficiently communicating a high volume of data, e.g. financial market data, from a server, e.g. an electronic match engine of an electronic trading system, over an electronic communications network to geographically disperse recipients, e.g., market participants located in different geographic regions, where one or more of those recipients may receive a customized version of that data, e.g., customized as to content, timing and/or form, but all of the recipients that receive the same data, must do so in the same relation with respect to the other received data, regardless of whether, irrespective of when the data was transmitted, they receive the data at the same time or not.

In particular, as the data is generated and formed into messages by the server for communication, messages comprising timing information and/or changes to information relating to how the data is to be customized are incorporated forming a data stream which is communicated to local data publishers located in each region. As they receive each of the messages of the data stream, the local data publishers extract the data, customization information, or timing information and act in accordance therewith when transmitting the received data to the recipients coupled with the regional data publisher. Customization information is applied to update local control databases which specify the various customizations to apply to subsequently received data before it is sent to the recipients. By acting on each of the messages in real time, e.g., as they are received, each of the local data publishers, even if they don't receive the messages at the same time, then perform the same functions in the same relative order relative to the data stream.

Generally, the disclosed embodiments relate to data that is generated based on the occurrence of real time events wherein customized versions of that data is then distributed to multiple recipients. An example of such data may be a financial market data feed. Another example of such data may be a real time video feed with customizable attributes, such as modifiable point of view, frame rate, resolution, aspect ratio, etc.

Financial instruments may be traded via different electronic trading systems which may be characterized as either being bilateral or centrally cleared, or, as will be discussed, using a hybrid system which combines aspects of bilateral trading with a central counter party based trading system. In bilateral trading systems, often referred to as over the counter (OTC), trades are formed bilaterally, e.g. negotiated directly between the parties, credit and risk of loss are handled by the transacting parties, and OTC trades may involve standard or non-standard contract terms, depending upon the needs of the parties. It will be appreciated that once a bilateral trade is entered into, it may be submitted to a settlement system, such as the Continuous Linked Settlement (CLS) system. Typical instruments traded bilaterally include interest rate swaps and forward contracts.

A forward contract, such as a currency forward contract, is an example of a contract which is traded via a bilateral trading system and calls for delivery of an asset at a later date for a price determined at the inception of the contract. For currencies, a currency forward contract is a bilateral contract for delivery, actual or cash settled depending on the contract terms, of an amount of a particular currency, e.g. Euros, at a future date at a price, delineated in a different currency, e.g. dollars, determined at the inception of the contract. Unlike a futures contract, discussed below, a forward contract is traded "over the counter," bilateral, e.g. negotiated directly between the parties as discussed above, and may not be standardized as to its terms. Option contracts on a forward contract are also available offering the buyer thereof the right, but not the obligation, to sell or buy the underlying forward contract at a specified price on or before a certain expiration date. Forward contracts may be physically settled, e.g. via the delivery of the amount of the particular currency called for in the contract, or cash settled via delivery of the cash difference, denominated in currency of the contract price, between the contract price and the spot price of the currency to be delivered, which may be the differential in exchange rates between when the contract was entered into and the delivery date. Options contracts for the delivery of a specific currency may also be offered bilaterally and call for delivery of the requisite currency, as opposed to a forward contract therefore. Options contracts traded via a bilateral/OTC trading system may be referred to as OTC options or OTC options contracts.

An interest rate swap ("IRS") is another example of a contract which is traded via a bilateral trading system. An IRS is a contractual agreement between two parties, i.e., the counterparties, also referred to as the payer and receiver, where one stream of future interest payments is exchanged for another, e.g., a stream of fixed interest rate payments in exchange for a stream of floating interest rate payments, based on a specified principal amount or an assumed notional amount. An IRS may be used to limit or manage exposure to fluctuations in interest rates. One common form of IRS exchanges a stream of floating interest rate payments on the basis of the 3-month London interbank offered rate ("LIBOR") for a stream of fixed-rate payments on the basis of the swap's fixed interest rate. Another common form of IRS, known as an overnight index swap, exchanges, at its termination, a floating rate payment determined by daily compounding of a sequence of floating interest rates on the basis of an overnight interest rate reference (e.g., the US daily effective federal funds rate, or the European Overnight Index Average (EONIA)) over the life of the swap, for a fixed rate payment on the basis of daily compounding of the overnight index swap's fixed interest rate over the life of the swap.

In contrast, central counter party-based trading utilizes an intermediary entity to separate the transacting parties such that they are prevented from transacting/negotiating directly with one another. For example, a central counterparty based electronic trading system, such as a futures exchange, such as the Chicago Mercantile Exchange Inc. (CME), provides a contract market where financial instruments, e.g., futures and options on futures, are traded using electronic systems. "Futures" is a term used to designate contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price, referred to as the strike price, on or before a certain expiration date. An option contract on a futures contract, e.g., having a futures contract as an underlier, offers an opportunity to take advantage of futures price moves without actually having a futures position and is considered "in the money" when the strike price is favorable to the market price of the underlier. The commodity to be delivered in fulfillment of the contract, or alternatively the commodity for which the cash market price shall determine the final settlement price of the futures contract, is known as the contract's underlying reference or "underlier." The underlying or underlier for an options contract on a futures contract is the corresponding futures contract that is purchased or sold upon the exercise of the option. Options contracts traded via a central counterparty-based trading system may be referred to as Exchange Traded Derivative (ETD) options or ETD options contracts.

Typically, in contrast to a bilaterally traded contract, the terms and conditions of each futures contract are standardized as to the specification of the contract's underlying reference commodity, the composition of the commodity, quantity, delivery date, and means of contract settlement. Such standardization may improve the liquidity of these contracts, e.g. the case with which such contracts may be bought or sold. In embodiments described herein, terms and conditions of each futures contract may be partially standardized as to the specification of the contract's underlying reference commodity and attributes thereof. Options on futures may be similarly standardized as to, for example, quantity, strike price and expiration/maturity. The underlying reference commodity may include a range of possible qualities, quantities, delivery dates, and other attributes. For a spot market transaction, the underlying quality and attributes may be set, while a futures contract may provide predetermined offsets to allow for possible settlement of a non-conforming delivery. Physical settlement requires actual delivery of the underlying asset according to the contract terms. Cash settlement, in contrast, is a method of settling a futures contract whereby the parties effect final settlement, when the contract expires, by paying/receiving the loss/gain related to the contract in cash, rather than by effecting physical sale and purchase of the underlying reference commodity at a price determined by the futures contract. Options and futures may be based on more generalized market indicators, such as stock indices, interest rates, futures contracts, and other derivatives.

A central counterparty-based exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk on behalf of the transacting parties as well as the exchange. Clearing is the procedure through which the clearing house becomes buyer to each seller of a futures contract, and seller to each buyer, also referred to as a novation, and reduces risk of financial loss to each transacting party due to breach of contract by assuring performance on each contract. A clearing member is a firm qualified to clear trades through the clearing house.

An exchange computer system which operates under a central counterparty model acts, e.g., using the clearing mechanism described above, as an intermediary between market participants for the transaction of financial instruments. In particular, the exchange computer system interposes itself into the transactions between the market participants, i.e., splits a given transaction between the parties into two separate transactions where the exchange computer system substitutes itself as the counterparty to each of the parties for that part of the transaction. In this way, the exchange computer system acts as a guarantor and central counterparty and there is no need for the market participants to disclose their identities to each other, or subject themselves to credit or other investigations by a potential counterparty, as is done with bilateral trading. For example, the exchange computer system insulates one market participant from the default by another market participant. Market participants need only meet the requirements of the exchange computer system. Anonymity among the market participants further encourages a more liquid market environment as there are lower barriers to participation. The exchange computer system can accordingly offer benefits such as centralized and anonymous matching and clearing.

A "Clearing House," which is typically an adjunct to the Exchange and may be an operating division thereof, is responsible for settling trading accounts, clearing trades, collecting and maintaining performance bond funds, regulating delivery, and reporting trading data to market regulators and to the market participants. An essential role of the clearing house is to mitigate credit risk via the clearing process. Clearing is the procedure through which the Clearing House becomes buyer to each seller of a futures contract, and seller to each buyer, also referred to as a "novation," and assumes responsibility for protecting buyers and sellers from financial loss due to breach of contract, by assuring performance on each contract. A clearing member is a firm qualified to clear trades through the Clearing House.

In order to attract customers, as well as offer a more integrated experience, some central counterparty based trading systems facilitate bilateral trading and/or offer exchange traded products similar to those traded bilaterally, such as interest rate swap contracts. These trading systems provide the benefits of standardized instruments and anonymized trading to the trading of these types of instruments, offering more flexibility to a trader. However, enabling the trading of these types of instruments also adds complexity to the electronic trading system as traders, trading OTC/bilateral or similar exchange traded instruments, still prefer or are required to transact only with counterparties with which they have a predefined credit relationship, e.g., a counterparty for whom credit availability has been vetted. This, in combination with the anonymized operation of the electronic trading system, requires that the electronic trading system know of the credit relationships between the trading parties and implement mechanisms, such as filtering, to ensure that trading parties are able to access information, such as price quotes and other data, only from those counterparties with which they have a credit relationship.

Generally, electronic financial instrument trading systems allow traders to submit orders and receive confirmations, market data, and other information electronically via a communications network. These "electronic" marketplaces, implemented by, and also referred to as, "electronic trading systems," are an alternative trading forum to pit based trading systems whereby the traders, or their representatives, all physically stand in a designated location, i.e. a trading pit, and trade with each other via oral and visual/hand based communication.

In particular, as was described above, electronic trading of financial instruments, such as futures contracts, is conducted by market participants sending orders, such as to buy or sell one or more futures contracts, in electronic form to the Exchange. These electronically submitted orders to buy and sell are then matched, if possible, by the Exchange, i.e. by the Exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data messages or feeds. An order book, i.e., an order book database or data structure, is typically maintained for each product, e.g. instrument, traded on the electronic trading system and generally defines or otherwise represents the state of the market for that product, i.e. the current prices at which the market participants are willing buy or sell particular quantities of that product. As such, as used herein, an order book for a product may also be referred to as a market for that product. At any given time, an order book, or the market represented thereby, may be characterized by a state, i.e., the data records stored therein at that time which are indicative of the currently pending orders to buy or sell the particular products at particular quantities, and that state may change over time, i.e., as pending orders to buy/sell are at least partially satisfied by incoming counter orders resulting in updating, e.g., to reflect remaining available quantity, etc., or removing existing data records, as order modifications or cancelations are received and/or as new orders are received and data records indicative thereof are created.

A market data feed, also referred to as market data or a market feed, is a compressed or uncompressed real time (with respect to market events), or substantial approximation thereof, data/message stream, i.e., sequence of event generated messages, provided by the Exchange directly, or via a third party intermediary. A market data feed may be comprised of individual messages, each comprising one or more packets or datagrams, and may carry, for example, pricing or other information regarding orders placed, traded instruments and other market information, e.g., data indicative of a change in the state of the order book database, such as summary values and statistical values, or combinations thereof created in real time, e.g., at the time of the change in state or substantially proximate thereto, and may be transmitted, e.g. multi-casted, to the market participants using standardized protocols, such as UDP over Ethernet.

More than one market data feed, each, for example, carrying different information, may be provided as will be described. The standard protocol that is typically utilized for the transmission of market data feeds is the Financial Information Exchange (FIX) protocol Adapted for Streaming (FAST), aka FIX/FAST, which is used by multiple exchanges to distribute their market data. It will be appreciated that other protocols may be used. Pricing/quantity information conveyed by the market data feed may include the prices/quantities, or changes thereto, of resting orders, prices at which particular orders were recently traded and/or quantities thereof, or other information representative of the state of the order book database/market or changes therein at the time that the market data was generated. Separate, directed/private, messages may also be transmitted directly to market participants to confirm receipt of orders, cancellation of orders and otherwise provide acknowledgment or notification of matching and other events relevant, or otherwise privy, only to the particular market participant.

As may be perceived/experienced by the market participants from outside the Exchange or electronic trading system operated thereby, the following sequence describes how, at least in part, information may be propagated in such a system and how orders may be processed:

(1) An opportunity is created at a matching engine of the Exchange, such as by placing a recently received but unmatched order, e.g. a data record indicative thereof, on the order book to rest;

(2) The matching engine creates an update reflecting the opportunity, e.g., based on the change in the state of the order book database, and sends it to a feed engine;

(3) The feed engine, also referred to herein as a data publisher, generates an electronic data message comprising data indicative of the update and multicasts it to all of the market participants to advertise the opportunity to trade;

(4) The market participants receive the data message and evaluate the opportunity and each, upon completion of their evaluation, may or may not choose to respond with an electronic trade order message comprising data indicative of a trade order responsive to the resting order, i.e. counter to the resting order;

(5) The Exchange gateway receives any counter orders generated by the market participants, sends confirmation of receipt back directly to each submitting market participant, and forwards the received orders to the matching engine; and (6) The matching engine evaluates the received orders and matches the first arriving order against the resting opportunity and a trade is executed. This causes another change in the state of the order book database which may again, trigger this cycle.

As used herein, a financial message or financial data message may refer both to messages communicated by market participants to an electronic trading system and vice versa. Financial messages communicated to the electronic trading system, also referred to as "inbound" messages, may include request messages, such as trader orders, order modifications, order cancellations and other transaction requests, as well as other message types. Financial messages communicated from the electronic trading system, referred to as "outbound" messages, may include messages, transmitted, as described, to all participants or just a particular participant, responsive to inbound messages, such as confirmation and/other response messages, or other messages such as market update messages, quote messages, and the like, e.g. market data messages.

Financial messages may further be categorized as having or reflecting an impact on a market, also referred to as an "order book" or "book," for a traded product, such as a prevailing price therefore, etc., or not having or reflecting an impact on a market or a subset or portion thereof. For example a request to place a trade may result in a response indicative of the trade either being matched with, or being rested on an order book to await, a suitable counter-order. In some cases, requests may elicit a non-impacting response, such as temporally proximate to the receipt of the request and then cause a separate market-impact reflecting response at a later time. For example, a stop order, fill or kill order, aka an immediate or cancel order, or other conditional request may not have an immediate market impacting effect, if at all, until the requisite conditions are met. Accordingly, an acknowledgement or confirmation of receipt, e.g. a non-market impacting communication, may be sent to the trader simply confirming that the order was received. Upon the conditions being met and a market impacting result thereof occurring, a market-impacting message may be transmitted as described herein. It will be appreciated that additional conditions may be specified, such as a time or price limit, which may cause the order to be dropped or otherwise canceled and that such an event may result in another non-market-impacting communication instead. As will be described below, in some implementations market impacting communications may be communicated separately from non-market impacting communications, such as via a separate communications channel or feed.

It will be further appreciated that various types of market data feeds may be provided which reflect different markets or aspects thereof. Market participants may then, for example, subscribe to receive those feeds of interest to them. For example, a particular market data feed may only communicate information related to the top buy/sell prices for a particular product, referred to as "top of book" feed. In this case, a request message may be considered market-impacting only if it affects the top buy/sell prices and otherwise is considered non-market-impacting. As market impacting communications tend to be more important to market participants then non impacting communications, this separation may reduce congestion and or noise among those communications having or reflecting an impact on a market or portion thereof.

Market data feeds may further be characterized as providing a "view" or "overview" of a given market, an aggregation or a portion thereof. For example, a market data feed may convey the entire state of a market for a particular product, e.g. all presently resting buy/sell orders and prices associated therewith as well as trade notifications, etc., only a portion of a market, e.g. only the top 10 resting buy/sell orders, and/or an aggregation of multiple markets or portions thereof. As used herein, a market impacting request may be said to impact the "view" of the market as presented via the market data feed.

To conserve bandwidth, the market data feed may only convey changes to the order book database where it is incumbent upon the recipient to maintain their own copy of the order book database and apply the changes from the market data feed thereto in order to see, ascertain or otherwise have access to the complete current state of the order book database. In some implementations, the electronic trading system may periodically, e.g. daily or weekly, communicate the entire current state of the order book database so that recipients may update, synchronize or "true up" their own copy.

Various types of market data feeds may be provided by electronic trading systems, such as the CME, in order to provide different types or subsets of market information or to provide such information in different formats. Examples include Market By Order, Market Depth (aka Market by Price to a designated depth of the book), e.g. CME offers a 10-deep market by price feed, Top of Book (a single depth Market by Price feed), and combinations thereof. There may also be all manner of specialized feeds in terms of the content, i.e. providing, for example, derived data, such as a calculated index). It will be appreciated that number, type and manner of market data feeds provided by an electronic trading system are implementation dependent and may vary depending upon the types of products traded by the electronic trading system, customer/trader preferences, bandwidth and data processing limitations, etc. and that all such feeds, now available of later developed, are contemplated herein.

Generally, as will be described, not all market participants may receive the same market data messages at the same time, i.e., the electronic trading system may intentionally not transmit the same market data messages to all market participants and/or may not transmit the same market data messages to all market participants at the same time. Variations, e.g., in form, content and/or timing, of the transmission of market data messages to different market participants, or subsets thereof, may be due to system constraints, such as subscription type, permissions, regulatory requirements, etc., and/or recipient preferences, as will be described.

Generally, the disclosed embodiments recognize that once market data messages are transmitted from the exchange computer system, those messages, even if transmitted substantially simultaneously, may be subject to delays in transit, such as due to differences, aberrant or otherwise, in the latencies of the network connections over which those messages are communicated, which may cause those messages to arrive at their destination at different times. The disclosed embodiments, in general, are not necessarily concerned with such delivery variations but contemplate that mechanisms which at least attempt to compensate for such delivery variations may be implemented in addition to the disclosed functionality.

Accordingly, in one embodiment, market data recipients may specify preferences for the form and/or content of the market data they receive. For example, in addition to specifying the type of market data feed, as described above, a market participant may specify particular products/instruments, or categories/types of products/instruments, for which they are interested in receiving market data. Alternatively, or in addition thereto, a market participant may specify one or more criteria which define which market data to send and when to send it. For example, such criteria may include price change or quantity thresholds which must be met, or exceeded, by a given market data message, i.e., the change in state or event represented thereby, to be transmitted. As will be appreciated, such criteria may be specified positively, defining what market data to send, or negatively, defining what market data not to send. As will be described, a control database may be provided which stores the preferences/criteria of the market participants. Prior to transmitting a market data message, the control data base is accessed to determine whether to send the market data message to a particular participant or not.

In another example, customized market data feeds may be provided allowing market participants to specify a customized field order and/or additional custom data fields to be included in their market data feed. As was described above, electronic trading systems broadcast market data feeds to the market participants to notify them of changes in the state of the market, such as price updates, trade notifications, etc. The feeds comprise a stream of individual event messages which are multi-casted to the market participants in a predefined format, e.g. FIX/FAST, such that all market participants receive the same information. Upon receipt, many market participants, including feed aggregators which aggregate data feeds from other exchanges and which further may modify and/or relay the data feed to others, typically further process the market data from the feed, such as by using a Ticker Plant, to tailor the data, e.g. the content and/or format, to their particular needs, and then rebroadcast the modified data, such as to their individual trader/trader terminals.

This tailoring may further include extracting one or more subsets of data from each data feed message considered to be more important than the remaining data, reordering the data in a format further suitable for subsequent processing, e.g. so that more critical data is processed first, and deriving, extracting or otherwise computing values or metrics based on the data. It will be appreciated that such tailoring of the market data feed may occur elsewhere, such as at a trader terminal. Examples of derived values include "Greeks" which is a set of different measures/dimensions/variables of risk involved in taking a position in an option (or other derivative). Each Greek, or particular measure of risk, is a result of an imperfect assumption or relationship of the option with another underlying variable. Various sophisticated hedging strategies are used to neutralize or decrease the effects of one or more of these measures of risk. Not all of these risk measures are important to all market participants and some are more important than others. With the exception of Vega (which is not a Greek letter), each measure of risk is represented by a different letter of the Greek alphabet. Greeks include $\Delta$ (Delta) represents the rate of change between the option's price and the underlying asset's price—in other words, price sensitivity;

$\Theta$ (Theta) represents the rate of change between an option portfolio and time, or time sensitivity;

$\Gamma$ (Gamma) represents the rate of change between an option portfolio's delta and the underlying asset's price—in other words, second-order time price sensitivity;

$\Upsilon$ (Vega) represents the rate of change between an option portfolio's value and the underlying asset's volatility—in other words, sensitivity to volatility; and $\rho$ (Rho) represents the rate of change between an option portfolio's value and the interest rate, or sensitivity to the interest rate.

It will be appreciated that there may be other derived or computed values, now available or later developed, of interest to market participants which may be provided by the electronic trading system in a customized market data as described. For example, such other derived or computed values may include:

non-public data—e.g. such as order identifiers or hidden quantities privy only to a specific trader;

Position data—data showing a trader's risk exposure (similar to delta, but tied to actual orders) due to a shift in the market; or Requests For Quote(s)—certain requests for quotes may not be fully public, and need to be filtered only to the traders allowed to respond to the RFQ.

Accordingly, the disclosed embodiments may offer a "value added" market data feed by providing the capability for a market participant to customize the market data feed to their needs by specifying the order of the data within each feed message and/or specifying desired computed or derived values to be included in, or otherwise coalesced with, the feed message. Other market participants would continue to receive the standard market data feed. In one embodiment, customized market data feeds may be provided as a service, such as a subscription service, whereby a market participant pays the operator of the electronic trading system a fee, such as a one-time or periodic, e.g. monthly, annual, etc., for the service. This fee, which may vary depending upon the amount of customization or other factors, may be in addition to, or included within, a fee paid for the standard market data feed. For example, the operator of the electronic trading system may provide a web site to which market participants log in via an account associated therewith. The web site may present the various options for customizing the market data feed and the cost associated therewith and allow the market participant to choose the desired customizations. A sample of the customized market data message may then be provided, based on a real or synthetic market data message to allow the market participant to confirm their desired customizations. Further, the web site may permit the market participant to provide a payment medium, such as a credit card, etc., or authorization to cover the costs. In one embodiment, the market data feed customizations may be limited to a set of defined customizations, or templates, from which the market participant may select. Alternatively, the market participant may be permitted to customize all aspects of the market data feed. It will be appreciated that the number, type and degree of permitted customization, from predefined templates to fully customized specifications, is implementation dependent and all are contemplated herein.

By providing customized market data feeds, the need by the market participants to further process the market data messages upon receipt is eliminated thereby avoiding the need to implement costly and complex software to process the data and the processing delay incurred thereby. As noted above, the specified customizations may be stored in the control database and applied in real time as market data messages are generated and prepared for transmission as will be described.

In addition, what market data messages get sent to which market participants, and in what form, may be subject to limits, restrictions or constraints imposed by the electronic trading system. For example, the system may define participant categories or classifications which specify which, and it what form, market data messages may be transmitted to which participants based on which category the participant is assigned to. Data indicative thereof may be stored in the described control database. At least one category of participants may receive all messages, wherein other categories of participants only receive subsets thereof, such as based on the product type for which a given message relates, etc. As will be described, each category may be further defined by the timing of the transmission of the market data messages transmitted to participants categorized therein, e.g., in real time or delayed. It will be appreciated that the number of different categories and the associated criteria defining the form, content and/or timing of transmission of market data messages sent to participants based thereon may be implementation dependent.

Furthermore, as was described above, electronic markets for bilateral and bilateral-like exchange traded instruments, like interest rate swap contracts, may limit the availability of market data generated based on events caused by a particular market participant to only those market participants which have a pre-defined credit relationship therewith. In such an implementation, the electronic trading system may maintain a database, e.g., the control database referred to above or a separate database, which store data indicative of the predefined credit relationships between the market participants. When a market data message is generated, the control database may be accessed to determine to which market participants the market data message is to be sent, or in some implementations, which market participants are not to receive the message. The market data message is then transmitted only to the market participants authorized to receive it. Credit relationships between market data participants may change at any time, e.g. being added, removed or modified. In some cases, a credit relationship, as stored in the control database, may reflect an available amount of credit of a particular participant, in total and/or with respect to one or more other participants, which may fluctuate over time, e.g., as that participant enters into or completes transactions, wherein, in order to receive a particular market data message, a participant must have sufficient credit available. For example, where a market data message contains data indicative of a newly placed order at a particular price, that message may only be transmitted to those other participants that have a credit relationship with the originating participant and sufficient credit available relative to the value of the order. As credit relationships are altered in the control database, the then current credit relationships may be applied in real time to subsequently generated market data messages.

As was described above, the form and content of market data messages may be different for some recipients, e.g., some recipients may only receive subsets of the market data that is generated by the electronic trading system, due to system implemented limits/restrictions/constraints, in lieu of, or in addition to, any customizations, preferences or criteria that a given participant has specified. In addition, the timing of the transmission of market data messages to participants may be different for different participants. For example, market data may be transmitted to some participants in real time whereas such transmissions are delayed for other participants. As will be appreciated, real time transmission may refer to the transmission of a given market data message as temporally close as possible to either the occurrence of the event that caused the message to be generated or receipt of the message by a local data publisher, as will be described, or otherwise transmitted without added delay. Delayed transmission may refer to deferring transmission of a generated message until expiration of a specified duration of time measured from receipt of the message or from another event, e.g., receipt of another message such as a heartbeat message, or until the occurrence of an event which may include occurrence of specified day and/or time, receipt of another message, such as a heartbeat message, etc. Delayed transmission may be implemented by storing the deferred message in a memory, buffer or queue until such time as the system determines that the message is to be transmitted, or transmitting the message to the recipient via a transmission path having sufficient latency.

For example, the system may define participant categories whereby market data messages may be transmitted, e.g., with respect to when those messages were generated, at different times to participants categorized in different categories. These categories may be the same as used for varying the form/content of messages, or they may be different, separately applied categories. For example, messages may be transmitted to one category of participants in real time, i.e., as proximate to the generation of the message as possible, wherein those same messages may transmitted after a slight delay, e.g., 20 ms to 20 minutes, to participants categorized in another category. As was described, each category may be further defined by the form and/or content of the market data messages transmitted to participants categorized therein. It will be appreciated that the number of different categories and the associated criteria defining the form, content and/or timing of transmission of market data messages sent to participants based thereon may be implementation dependent.

In one embodiment, the electronic trading system may implement subscription levels for the timeliness of the transmission of market data messages and/or the form or content thereof, e.g., real-time (transmitted as proximate to the generation of the message as possible), 5 minute delayed, etc. Each tier may be associated with a different subscription cost based on the level of delay, e.g., the closer to real time transmission, the more expensive the subscription cost. Accordingly, one market participant may choose to receive immediate/real-time market data while another elects to receive delayed market data. Subscriptions may be defined for different product groupings and/or based on other criteria. It will be appreciated that the number of different subscription levels and the associated criteria defining the form, content and/or timing of transmission of market data messages provided thereby may be implementation dependent.

As will be described in detail, the electronic trading system may maintain a database or other data structure, which may be referred to as a control database, which stores data indicative of categorization of participants and/or subscription levels and which may store all of the data necessary to control the form, content and/or timing of the transmission of a given market data message to a particular participant.

In addition, the electronic trading system may implement restrictions or limitations on the transmission of particular messages to all or a subset of participants, such as embargoes, e.g., based on regulatory rules, etc., whereby the transmission of certain market data messages must be delayed for all, or a subset of market participants, for a specified time period or until after the occurrence of a specified event, such as a release of a government or corporate report. In one embodiment, the message itself may contain a signal or other indicator which indicates that it should be delayed and for how long, and/or the criteria which must be met for it to be transmitted.

Another unique aspect of a market data feed is the deterministic relationship between the constituent messages thereof.

Generally, electronic trading systems should operate in a deterministic, i.e. a causal, predictable, or otherwise expected, manner as understood and experienced by the market participants, i.e. the customers of the Exchange, such as may be reflected in the market data feed.

Accordingly, the operators of electronic trading systems, alone or in conjunction with, or at the direction of, regulatory or industry organizations, typically publish or otherwise promulgate rules or regulations, referred to as business or operating rules, which govern the operation of the system. These rules define how, for example, multiple transactions are processed by the system where those transactions have relationships or dependencies there between which may affect the result of such processing. Such business rules may include, for example, order allocation rules, i.e. rules which dictate which of multiple competing resting orders will be matched with a particular incoming order counter thereto having insufficient quantity to fill all of the suitable resting orders.

For example, under a first-in-first-out methodology, the first order, of the competing resting orders, that was received by the electronic trading system will be matched with the incoming counter-order and filled to the extent possible by the available quantity, with any residual quantity of the incoming counter order then being allocated to the next received suitable competing resting order and so on until the available quantity of the incoming counter order is exhausted. However, additional or alternative matching/allocation rules may be implemented as well, for example to ensure fair and equal access, improve trading opportunities, etc., by allocating, such as proportionally, the available quantity of the incoming counter order among all, or a subset, of the competing resting orders until the available quantity is exhausted.

Once such business rules are established, or modified, market participants will expect, and overseeing regulatory entities may require, that the electronic trading system operate in accordance therewith. That is, if the Exchange adopts a rule to give first arriving orders priority over later arriving orders, a market participant who submits an earlier arriving order will expect their order to be filled prior to a later arriving order submitted by another market participant. It will be appreciated that these rules, by which operators of an electronic trading system may choose to operate their system, may vary at the discretion of the operators, subject to regulatory concerns. Generally, the term "transactional determinism" may refer to the processing, or the appearance thereof, of orders in accordance with the defined business rules.

With respect to market data, i.e., the messages which effectively report the results of the operations performed by the electronic trading system, it may be important that all market participants receive the market data messages in the same order and that the results of any events occurring at, or processing by, the electronic trading system, be reflected within the market data messages such that they are perceived by all of the recipients of that market data in the same relative sequence.

For example, where the market data messages carry data indicative of the changes in the state of the electronic trading system, a recipient keeping track of that state must receive those messages in the order in which they were generated in order to properly track and replicate the state of the electronic trading system. The disclosed embodiments, as will be described, ensure that all market participants receive the market data messages in the same sequence, though possibly not at exactly the same time. In particular, as will be described below, in one implementation of the disclosed embodiments, the speed of the connections which carry the base market data stream to each local data publisher is the minimum speed necessary to ensure, that while a subset of market participants may receive some market data messages before other market participants receive those same messages, those early recipients will be unable to capitalize on any information advantage gained by being able to, for example, transmit a trade order based thereon back to the electronic trading system before the later recipients.

Accordingly, as will be appreciated, market data messages are unique in that they are generated in real time, e.g., as changes in the state of the market/trading system occur, they are ephemeral in that their value as/likelihood of reflecting the current state of the electronic trading system diminishes with their age, and they are deterministic in that the order in which they are generated is the order in which they must be received/processed by a recipient in order for that recipient to recreate or otherwise know the stat of the market/trading system at the time a given message was generated.

As the above described customizations to the market data messages can only be applied to those messages that have not yet been transmitted by the trading system to recipients, these customizations also represent a state which is reflected in the market data messages and which may vary, e.g., as credit relationships, preferences, etc. change. As such changes are received and stored in the control database, as will be described, they are applied to those messages that are subsequently generated by the trading system. For example, if two participants have a credit relationship which is reflected in the control database, market data messages generated based on the events related to one party will be transmitted to the other party. If that credit relationship then ends, messages generated subsequent to the updating of the control database reflecting the end of the credit relationship will not be sent to the other participant.

As will be appreciated, the possible variations in market data feeds due to system restrictions and/or recipient preferences can result in the electronic trading system having to transmit numerous unique market data streams to the various market participants which may consume significant communications network bandwidth. As the market participants may be located in disparate geographic regions, communicating all of the unique market data streams thereto may further require communicating a significant volume of data between regional sub-networks via high cost network interconnections.

The disclosed embodiments conserve network bandwidth and/or efficiently utilize low latency connections, and thereby improve performance and/or reduce cost, by communicating a single base market data stream to regionally located local data publishers, each of which apply any requisite customizations locally to create and distribute the customized market data feed to those participants located in that region. In addition, any modifications to the customizations, i.e. to the data stored in the control database, are embedded in real time, i.e., as those modifications are received relative to the generation of market data messages, into the base market data stream communicated to the local data publishers which updated their copy of the control database as the modifications are received and apply the then current customizations to the subsequently received market data messages. In addition, periodic timing, e.g., heartbeat, messages are embedded into the base market data stream in real time, i.e., in relation to the generation of the market data messages, which provide a common reference point to the local data publishers to relate subsequently received market data or modification messages to previously received messages and to provide a temporal point of reference for applying transmission delays to the transmission of market data messages to recipients.

More particularly then, a single base market data stream can be provided to local data publishers efficiently via the high performance, i.e., high speed and/or high bandwidth, inter-network communications links, thereby reducing the actual amount of bandwidth consumed thereby, along with the net usage cost. The local data publishers process the messages received via this base data stream as those messages are received using a local control database which specifies any requisite customizations to apply prior to transmission of market data messages to the participants, processing and applying embedded modifications to the control database as they are received, and coordinating operations based on received timing messages. The customized market data messages are then transmitted to the subset of participants connected to the local data publisher, e.g., within the same geographic region, via lower performance regional communications links, i.e., where the higher volume of data may incur lower usage costs. While the messages of the base data stream may not be received by all of the local data publishers at the same time, they all receive those messages in the same order and therefore process and apply the same customizations relative to the market data messages.

The management and conveyance of electronic market data messages over an electronic communications network is a technical implementation and problems therewith, such as excessive bandwidth utilization or latency, are technical problems which can affect computer processes and systems which rely on those networks for operation. As such, the disclosed embodiments provide technical solutions to these technical problems.

The disclosed embodiments provide an improved market data distribution platform/architecture which distributes a base message data stream, having embedded therein real time updates to distribution control information and timing information, to local data publishers which act on the messages in the data stream as they are received so as to provide customized data streams to participants coupled therewith in a consistent manner across all of the publishers, and therefore provide a specific and practical application which improves upon prior market data distribution platforms and provides additional functionality not previously provided.

The disclosed embodiments solve problems which uniquely arise in the fields of computer technology and electronic communication. Thus, the disclosed embodiments are rooted in computer technology in order to overcome problems specifically arising in computer systems and electronic network communications. Indeed, the subject technology improves the functioning of the computer network by, for example, reducing the amount of network bandwidth to communicate market data between geographic regions and otherwise efficiently utilizing communications links of differing capabilities to distribute customized data streams.

Computing Environment

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants or market data recipients, may be referred to by other nomenclature, such as clearing firm or clearing entity, reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods, including the functions of the clearing house described above, is shown in FIG. 1. An exchange computer system 100 receives messages that include orders and transmits market data related to orders and trades to users, such as via wide area network 162 and/or local area network 160 and computer devices 150, 152, 154, 156 and 158, as described herein, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 5:
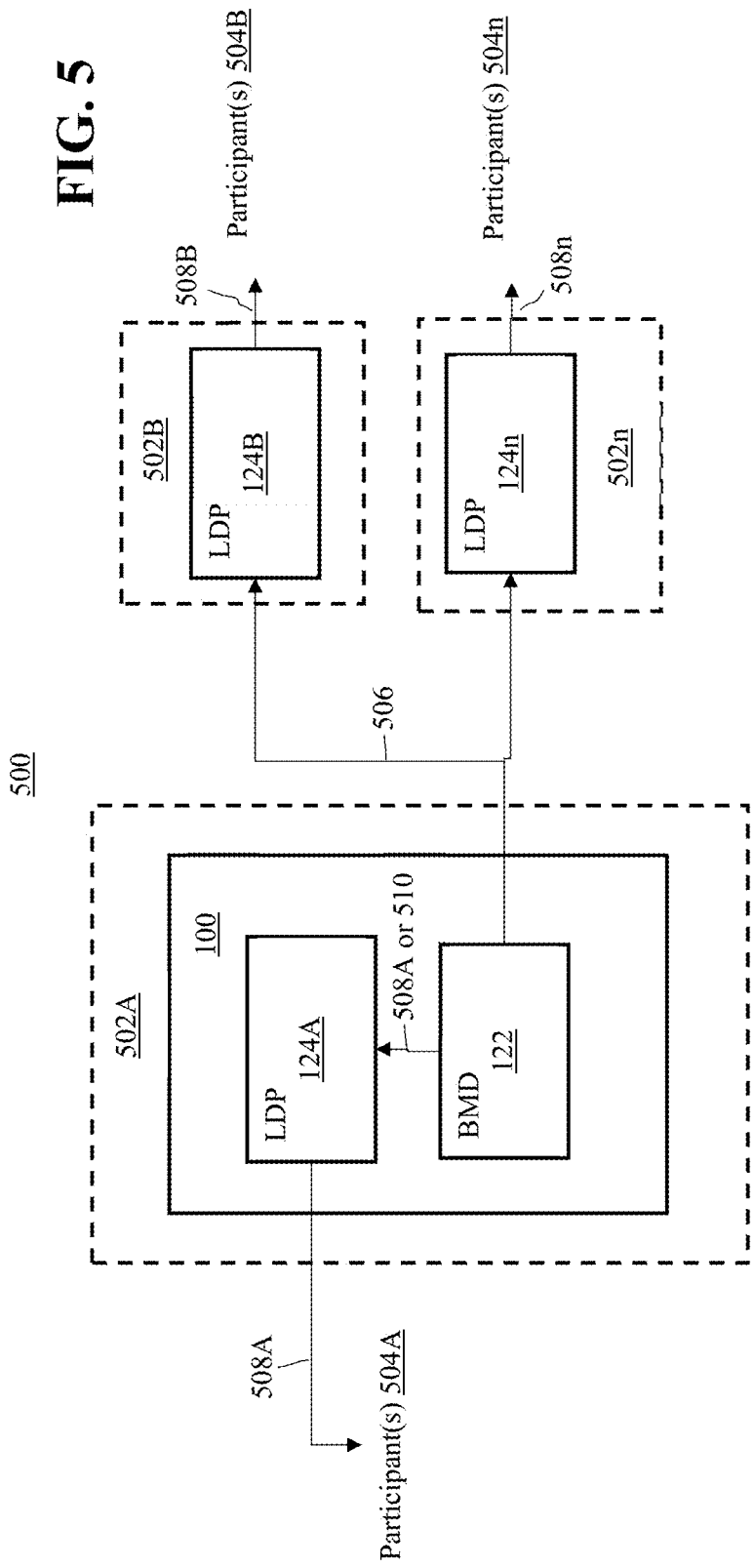
FIG. 5 depicts a block diagram of a system for distribution of market data, according to some embodiments.

A system/architecture 500 for market data distribution is shown in FIG. 5. As shown in FIG. 5, the exchange computer system 100 may be located in a particular geographic region 502A for which is provides market data feeds to the participants 504A (150, 152, 154, 158) located in that region, e.g., coupled with the exchange computer system 100 via a local area subnetwork 508A (160). As will be described, the exchange computer system 100 includes a base market data distributor module 122 which is coupled with a local instance of a local market data publisher module 124A and with one or more other local market data publisher modules 124B, 124n, located in other geographic regions 502B, 502n which service market data recipients located therein and coupled with their regional local market data publisher module 124B, 124n via a local area subnetwork 508B, 508n deployed in the respective region. The base market data distributor module 122 may be coupled with the local instance of a local market data publisher module 124A via a local area network or other connection, such as inter-process or direct connection. Alternatively, the base market data distributor module 122 may be coupled with the local instance of a local market data publisher module 124A via a wide area network connection 506 (162) similar to that used to interconnect the base market data distributor module 122 with other instances of the regional local market data publisher modules 124B, 124n. As was described above, the wide area network interconnections 506 may comprise high speed (low latency) and/or high bandwidth backbone networks which interconnect regionally deployed subnetworks. It will be appreciated that the wide area network interconnections 506 may comprise redundant interconnections for reliability and fault tolerance. While the wide area network interconnections 506 are shown as directly interconnecting the base market data distributor module 122 with the other instances of the regional local market data publisher modules 124B, 124n, it will be appreciated that the wide area network interconnections 506 may be implemented with one or more intermediate network nodes or interconnections offering numerous alternative network pathways therebetween. While FIG. 5 depicts a single exchange computer system 100 which, as will be described, distributes market data to other regionally located local market data publisher modules 124B, 124n for subsequent distribution to regionally located market data recipients, it will be appreciated that the system 500 may include more than one exchange computer system 100, each located in a different one of the geographic regions 502A, 502B, 502n, and each may operate as describe herein. For example, each exchange computer system 100 may offer trading of particular products and/or each exchange computer system 100 may be active at any one particular time, e.g., to implement a "follow the sun" architecture providing an active trading instance in each region during the daytime/business hours of that region, etc. While it is expected that a particular market data recipient 504A, 504B, 504n (150-158) will connect to the local market data publisher 124A, 124B, 124n located in the same geographic region 502A, 502B, 502n, i.e., coupled with the same local area subnetwork 508A, 508B, 508n to receive market data therefrom, it will be appreciated that the nature of computer networks, e.g., the Internet, would allow any market data recipient 504A, 504B, 504n (150-158) to connect with any local market data publisher 124A, 124B, 124n, albeit with likely different, e.g., higher, latency. This may be useful, for example, should any one local market data publisher 124A, 124B, 124n experience a fault and be unable to deliver market data.

Regardless of how many exchange computer systems 100 may be provided, the disclosed embodiments will be described with respect to the one exchange computer system 100 from which a given market data message originates, e.g., where the match event or other change in state of the system occurs as well as where the control data is maintained regarding which market data recipients 504A, 504B, 504n (150-158) receive which market data messages, in what form and when. It will be appreciated that which exchange computer systems 100 originates the market data message and maintains the control data may change.

Figure 2:
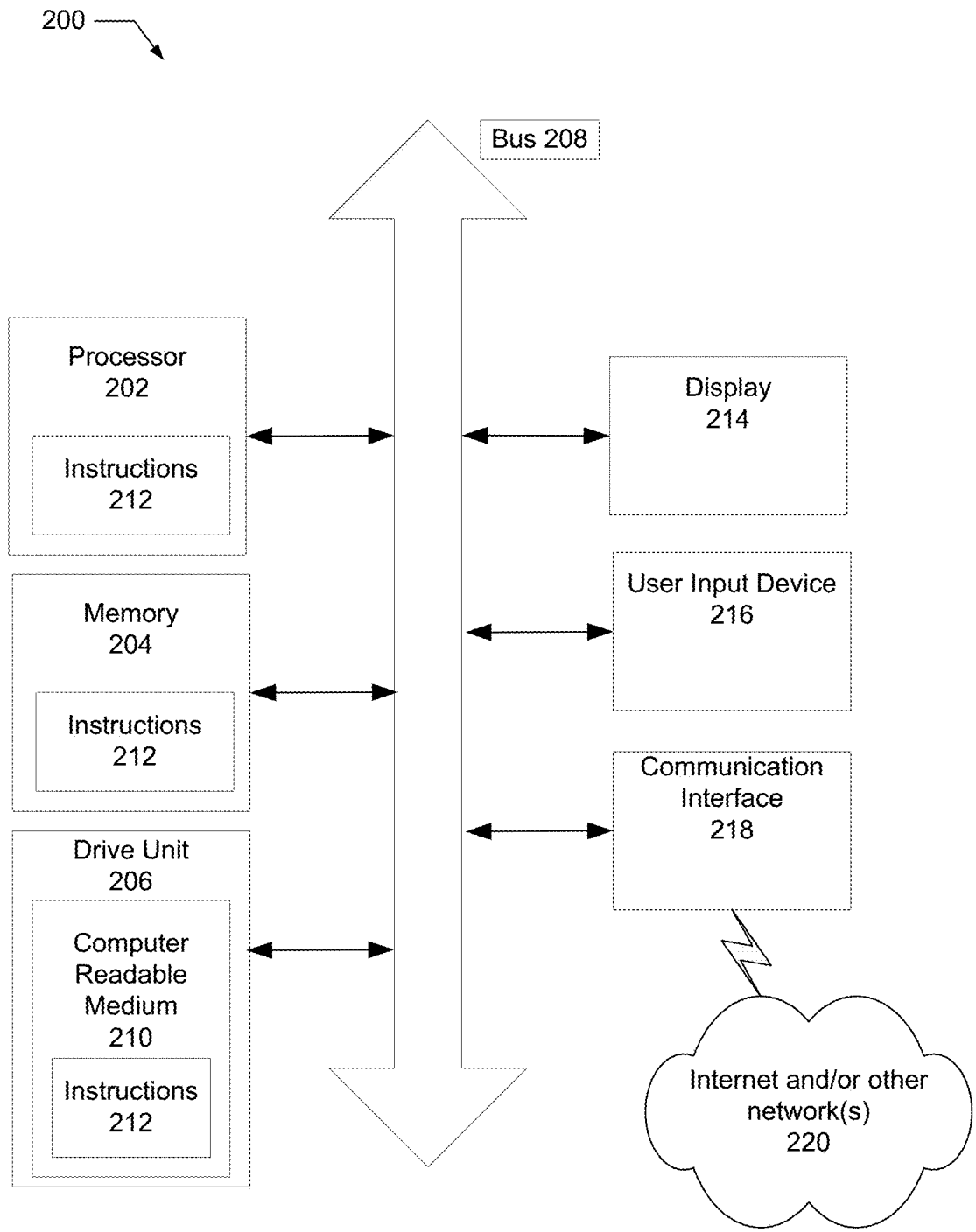
FIG. 2 depicts a general computer system, according to some embodiments.

Referring back to FIG. 1, The exchange computer system 100 may be implemented with one or more mainframe, desktop or other computers, such as the example computer 200 described herein with respect to FIG. 2. A user database 102 may be provided which includes information identifying traders and other users of exchange computer system 100, such as account numbers or identifiers, usernames and passwords. The user database 102 may further comprise the data indicative of credit relationships, subscription levels, preferences or other data used to control the form, content and/or timing of delivery of market data messages to particular market data recipients. This data may be separately referred to as the control data used by the local market data publisher module 124A of the exchange computer system 100. In one embodiment, this data may be stored in a separate control database (not shown). The exchange computer system 100 maintains this control data, updating it as changes occur, e.g., as credit relationships are updated, preferences change, subscriptions modified, etc. It will be appreciated that the control data/control database of the exchange computer system 100, as used by the local instance of the local market data publisher module 124A, receives changes thereto directly from the systems (not shown) of the exchange computer system 100 which are responsible for maintaining that data, e.g., for managing credit relationships, participant preferences, subscriptions, etc. whereas the control databases of the regional instances of the local market data publishers 124B, 124n, receive their updates as described herein. In other words, a market participant wishing to alter their credit relationships, preferences or subscription, must go through the exchange computer system 100 which will then propagate those changes to the regional instances of the local market data publishers 124B, 124n as will be described. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, trade database 108 may store information identifying the time that a trade took place and the contract price.

An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users. For example, the market data module 112 may prepare the market data messages to be distributed via the market feeds described herein via the base market data distributor 122 and local market data publisher 124A, described in more detail below.

A risk management module 114 may be included to compute and determine a user's risk utilization in relation to the user's defined risk thresholds. The risk management module 114 may also be configured to determine risk assessments or exposure levels in connection with positions held by a market participant. The risk management module 114 may be configured to administer, manage or maintain one or more margining mechanisms implemented by the exchange computer system 100. Such administration, management or maintenance may include managing a number of database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the Market Segment Gateway ("MSG") that is the point of ingress/entry and/or egress/departure for all transactions, i.e., the network traffic/packets containing the data therefore), message type (e.g., new, modify, cancel), and the number of matches generated by a message. Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately, or a fill and kill order (FOK) that is filled to the maximum amount possible based on the state of the order book at the time the FOK order is processed, and any remaining or unfilled/unsatisfied quantity is not stored on the books or allowed to rest).

An order processing module 118 may be included to decompose delta-based, spread instrument, bulk and other types of composite orders for processing by the order book module 110 and/or the match engine module 106. The order processing module 118 may also be used to implement one or more procedures related to clearing an order. The order may be communicated from the message management module 116 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module 118 may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements, and may be configured as part of the order book module 110, part of the message management module 116, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included to provide one or more functions related to settling or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the exchange computer system 100. For example, the settlement module 120 and the risk management module 114 may be integrated to any desired extent. In some cases, one or more margining procedures or other aspects of the margining mechanism(s) may be implemented by the settlement module 120.

A base market data distributor module 122, shown in more detail in FIG. 3 described in more detail below, may be included to, according to the disclosed embodiments, receive market data messages, e.g., from the market data module 112 and/or match engine module 106, updates to the control data, e.g., from the user database 102, account data module 14, etc., and generate the base integrated market data message stream further incorporating timing messages, e.g., heartbeat messages, for distribution to the local market data publishers 124A, 124B, 124n, which will generate and distribute customized market data feeds for transmission to the market data recipients 504A, 504B, 504n (150-158) coupled therewith.

A local market data publisher module 124A for the exchange computer system 100 (other instances 124B, 124n are located in other geographic regions 502B, 502n), shown in more detail in FIG. 4 described in more detail below, may be included to, according to the disclosed embodiments, receive the base integrated market message data stream from the base market data distributor module 122 and process each received message upon receipt. Wherein if a received message comprises a market data message, the local market data publisher 124A, 124B, 124n access its local copy of the control database to determine to which participants to send the market data message, in what form and when. The local market data publisher 124A, 124B, 124n then transmits the received market data message accordingly. If the message received from the base market data distributor module 122 is an update to the control database, e.g., a change to credit relationships, preferences, subscriptions, etc., the local market data publisher 124A, 124B, 124n updates its copy of the control database accordingly, such that any changes will be applied to subsequently received market data messages. If the message received from the base market data distributor module 122 is a timing message, the local market data publisher 124A, 124B, 124n utilizes that information for determining when to transmit deferred/delayed market data messages, such as by updating/synchronizing internal timing logic, and may further utilize the timing messages to reconcile internal message transmission queues or otherwise confirm deterministic operation with respect to the order in which market data messages are received.

In one embodiment, the base market data distributor module 122 and local market data publisher module 124A of the exchange computer system 100 are combined into a single module which performs the described functions.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s). It should be appreciated that concurrent processing limits may be defined by or imposed separately or in combination on one or more of the trading system components.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade, clearing or other information therewith, such as by using messaging via the messaging module 122. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet based compute device, or other wireless device, may communicate with the LAN 160 and/or the Internet 162 via radio waves, such as via Wifi, Bluetooth and/or a cellular telephone based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 166 which may maintain a market by providing constant bid and offer prices for a derivative or security to the exchange computer system 100, such as via one of the exemplary computer devices depicted. The exchange computer system 100 may also exchange information with other match or trade engines, such as trade engine 170. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium.

For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Market Data Distribution Architecture

Figure 3:
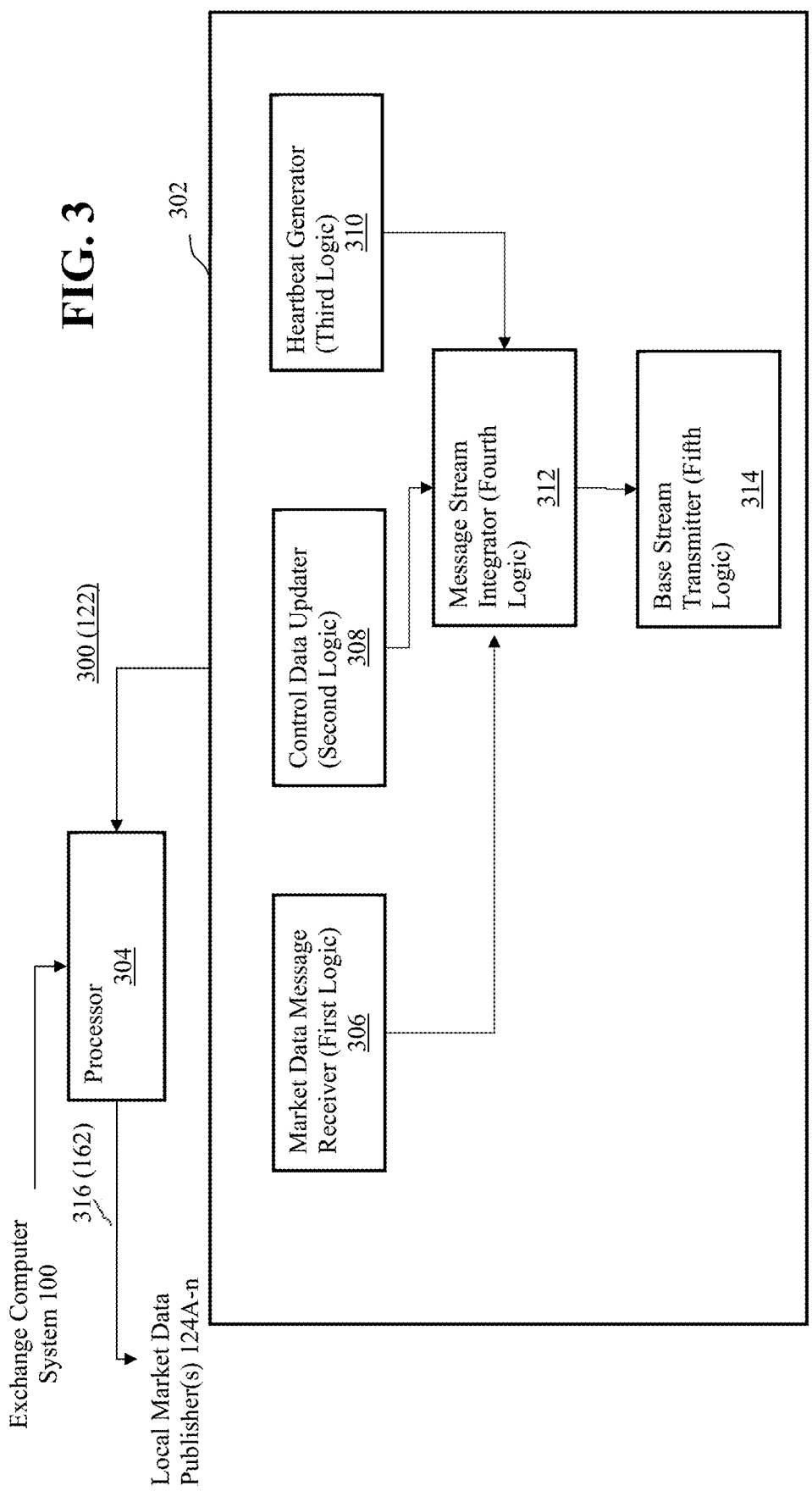
FIG. 3 depicts a block diagram of the base market data distributor module of FIG. 1, according to some embodiments.

FIG. 3 depicts a block diagram of the base market data distributor module 122 of FIG. 1, according to some embodiments, which may be implemented as a separate component or as one or more logic components, such as part of one more of the modules of the exchange computing system 100 described above, such as on an FPGA that may include a memory or reconfigurable component to store logic and a processing component to execute the stored logic, or as computer program logic, stored in a memory 302, or other non-transitory computer readable medium, and executable by a processor 304, such as the processor 202 and memory 204 described above with respect to FIG. 2. The base market data distributor module 122 receives market data messages, e.g., from the market data module 112 and/or match engine module 106, updates to the control data, e.g., from the user database 102, account data module 14, etc., and generates the base integrated market data message stream further incorporating timing messages, e.g., heartbeat messages, for distribution to the local market data publishers 124A, 124B, 124n, which will generate and distribute customized market data feeds for transmission to the market data recipients 504A, 504B, 504n (150-158) coupled therewith.

The base market data distributor module 122 includes a market data message receiver 306, which may be implemented as first logic or other computer executable program code 306 stored in the memory 302 and configured to be executed by the processor 304, or otherwise operative (coupled with) to receive market data and/or market data messages comprising data indicative of a change in state of an electronic marketplace, e.g., indicative of a change in state of at least one order book database, from the match engine and/or market data modules 106, 112. In one embodiment, the received market data/market data messages may be formed into data messages suitable for transmission of the local market data publishers 124 as part of a market data stream. In one embodiment, the received market data messages may include data indicative of whether or not the particular message should be delayed in transmission to all participants, e.g., embargoed, and for how long or upon what basis/event it should be released for transmission.

The base market data distributor module 122 further includes a control data updater 308, which may be implemented as first logic or other computer executable program code 308 stored in the memory 302 and configured to be executed by the processor 304, or otherwise operative to receive updates to the control database 412, described in more detail below, which stores data indicative of to which market participants to send a particular market data message, when to send the message and/or in what form. In one embodiment, the control data updater 308 receives updates from (is coupled with) the user database 102 and/or the account data module 104, described above, or other functionality within the electronic trading system 100 which manages credit relationship data, subscription data and/or preference data as described. The control data updater 308 forms the received updates into data messages suitable for transmission to the local market data publishers 124 such that they, upon receipt of a control data update message, can update their local control databases 412. In one embodiment, all control data updates are sent to all local market data publishers 124, each of which maintains a complete copy of the control database 412. Alternatively, the based market data distributor module 122 may maintain or be coupled with a database (not shown) which contains data indicative of which participants are connected to and receiving market data from which of the local market data publishers 124 wherein each local market data publisher 124 maintains control data only for those participants connected therewith, the base market data publisher 122 sending control data updates only to the local market data publisher 124 for which the update is relevant.

The base market data distributor module 122 further includes a heartbeat generator 310, which may be implemented as first logic or other computer executable program code 310 stored in the memory 302 and configured to be executed by the processor 304, or otherwise operative to generate timing messages which, as described, provide a point/frame of reference for temporally relative operations, such as the transmission of delayed/deferred market data messages, relative to the market data messages and the events/state changes indicated thereby. In one embodiment, these timing messages may be generated elsewhere and communicated to the heartbeat generator 310 for transmission. In one embodiment, timing messages may be generated periodically, such as every 100 ms. Alternatively, timing messages may only be generated when there are no other messages to be transmitted at a particular time and may be used to assure each local market data publisher 124 that the electronic trading system 100, as well as the communication networks, are functioning properly, e.g., "alive." In one embodiment, the timing messages may include data indicative of the time when the message was generated or when the message was transmitted to the local market data publishers 124. As such, the timing messages may allow the local market data publishers 124 to ascertain the current network transmission latency, etc., which may, for example, facilitate fault detection or utilization metrics, such as bandwidth utilization, load, etc. In one embodiment, the timing messages may include error detection or correction data such as a count (or checksum) of other messages sent prior to the latest timing message allowing the recipient to determine that all prior messages were received, or were properly received. In one embodiment, the timing messages may include administrative commands to control the receiving local market data publisher 124, such as to take it offline for maintenance, etc.

The base market data distributor module 122 further includes a message stream integrator 312, coupled with the market data message receiver 306, the control data updater 308, and/or the heartbeat generator 301, and which may be implemented as first logic or other computer executable program code 312 stored in the memory 302 and configured to be executed by the processor 304, or otherwise operative to integrate the data messages generated, produced and/or received by the market data message receiver 306, the control data updater 308, and/or the heartbeat generator 301, into a data message stream for transmission to the local market data publishers 124. The message stream integrator 312 integrates the data messages into the data message stream in real time, i.e., as they are generated, produced and/or received by the market data message receiver 306, the control data updater 308, and/or the heartbeat generator 301, such that the sequence of data messages in the data message stream are in an order for transmission which reflects their real time integration.

The base market data distributor module 122 further includes a base stream transmitter 314 coupled with the message stream integrator 312 and with the wide area network 316 (162), which may be implemented as first logic or other computer executable program code 314 stored in the memory 302 and configured to be executed by the processor 304, or otherwise operative to transmit the base data message stream to the local market data publishers 124 as it is generated by the message stream integrator 312. In one embodiment, the base stream transmitter 314 utilizes TIBCO FTL®, an application-to-application messaging system designed for low latency and high performance, produced by TIBCO Software Inc., located in Palo Alto, CA. In one embodiment, the base stream transmitter 314 is coupled with the local market data publisher 124A of the exchange computer system 100 using a local area network, interprocess communication or other medium.

Figure 4:
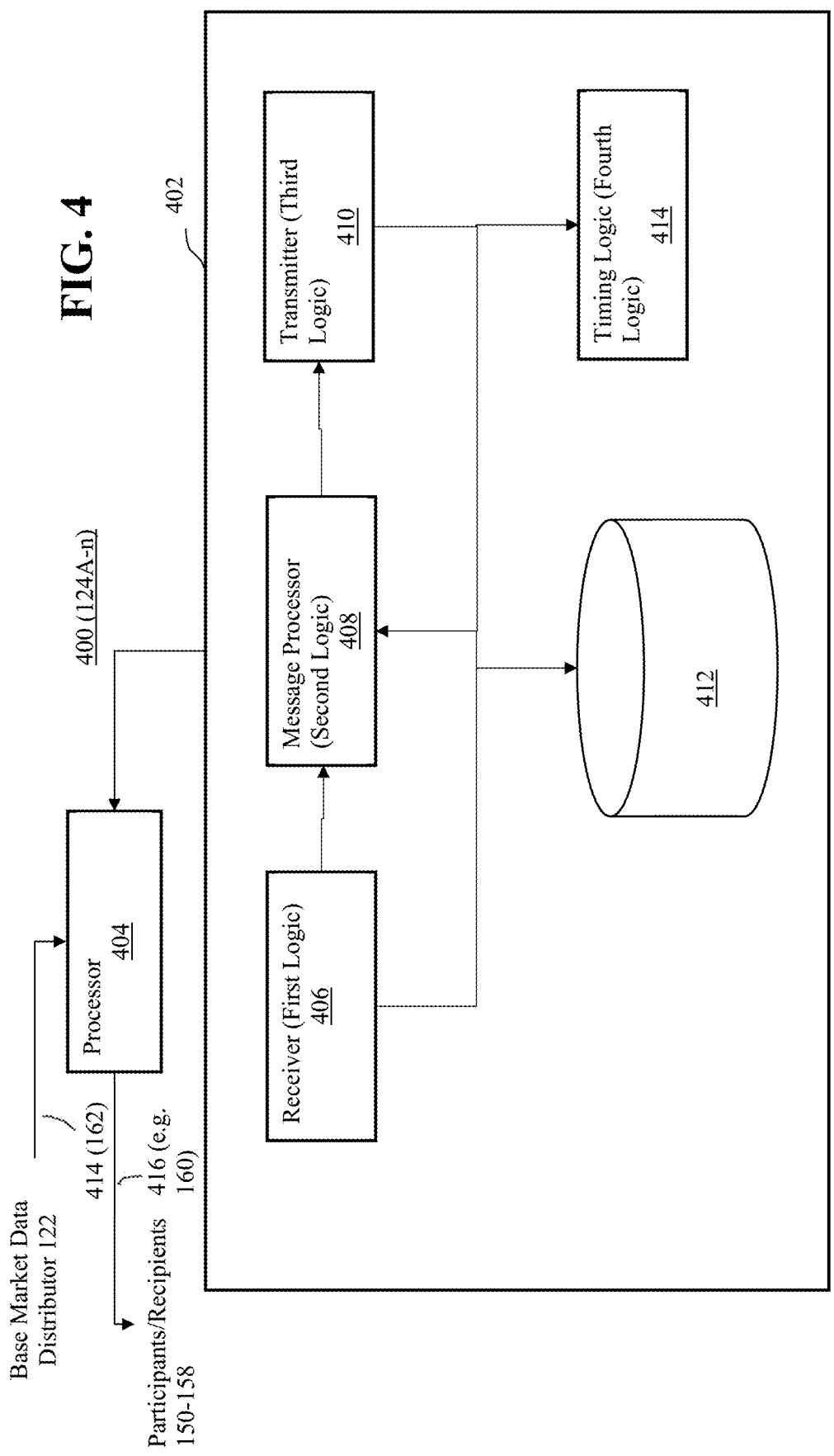
FIG. 4 depicts a block diagram of local market data publisher of FIGS. 1 and 5, according to some embodiments.

FIG. 4 depicts a more detailed block diagram of the local market data publisher module 124A, 124B, 124n of FIGS. 1 and 5, which may be implemented as a separate component or as one or more logic components, such as part of one more of the modules of the exchange computing system 100 described above, such as on an FPGA that may include a memory or reconfigurable component to store logic and processing component to execute the stored logic, or as computer program logic, stored in a memory 402, or other non-transitory computer readable medium, and executable by a processor 404, such as the processor 202 and memory 204 described above with respect to FIG. 2.

The local market data publisher 124, generally, is operative to receive the base integrated market message data stream from the base market data distributor module 122 and process each received message upon receipt, e.g., in real time. Wherein if a received message comprises a market data message, the local market data publisher 124A, 124B, 124n accesses its local copy of the control database 412 to determine to which participants to send the market data message, in what form and when. The local market data publisher 124A, 124B, 124n then transmits the received market data message accordingly. If the message received from the base market data distributor module 122 is an update to the control database, e.g., a change to credit relationships, preferences, subscriptions, etc., the local market data publisher 124A, 124B, 124n updates its copy of the control database accordingly, such that any changes will be applied to subsequently received market data messages. If the message received from the base market data distributor module 122 is a timing message, the local market data publisher 124A, 124B, 124n utilizes that information for determining when to transmit deferred/delayed market data messages, such as by updating/synchronizing internal timing logic 414, and may further utilize the timing messages to reconcile internal message transmission queues or otherwise confirm deterministic operation with respect to the order in which market data messages are received.

The local market data publisher 124 includes a control database 412 which stored data indicative to which market participants should receive which market data messages, when and in what form. For example, the control database 412 may include data, referred to as control data, indicative of credit relationships between participants, subscription information and/or preference data as described herein which may be used to customize the recipients, content, form and/or timing of the market data messages transmitted by the local market data publisher 124, including, for example, a registry of which participants are coupled with, e.g. registered with, the particular local market data publisher 124 to receive market data therefrom. In one embodiment, the local market data publisher 124A of the exchange computer system 100 does not include its own control database 412 but, instead, accesses the master databases which store the requisite information, e.g., the user database 102 and/or account data module 104. In one embodiment, the control database 412 includes control data for all participants. Alternatively, the control database 412 includes control data only for those participants coupled with, e.g., registered with, the particular local market data publisher 124 to receive market data therefrom.

The local market data publisher 124 further includes timing logic 414 which may be used to determine when to transmit delayed or deferred market data messages. For example, the timing logic 414 may be updated by received timing messages from the base market data distributor 122 and, based thereon, determine when a delayed or deferred market data message should be transmitted to those market participants who are supposed to receive it. In one embodiment, the receipt of a timing message is considered an event which triggers the transmission of any previously received delayed/deferred market data messages. Alternatively, the receipt of a timing message may initiate timer, either fixed, variable or defined by a deferred market data message, upon the expiration of which any previously received deferred/delayed market data messages are transmitted. As was discussed above, only a subset of market participants may receive the delayed message whereas other the message is transmitted to other participants upon receipt. The timing logic 414 may be further operative to ensure that each local market data publisher 124 operates in a synchronized manner with the other local market data publishers 124 with respect to the same sequence of data messages received from the base market data distributor 122, i.e., that each local market data publisher 124 receives and acts upon the data messages in the same order, even if not at the same time.

The local market data publisher 124 further includes a message receiver 406, which may be implemented as first logic or other computer executable program code 406 stored in the memory 402 and configured to be executed by the processor 404, or otherwise operative to receive the base market data message stream from the base market data distributor 122 via the wide area network 414 (162). In one embodiment, the message receiver 406 utilizes TIBCO FTL®, an application-to-application messaging system designed for low latency and high performance, produced by TIBCO Software Inc., located in Palo Alto, CA. In one embodiment, the base stream transmitter 314 is coupled with the message receiver 406 local market data publisher 124A of the exchange computer system 100 using a local area network, inter-process communication or other medium.

The local market data publisher 124 further includes a message processor 408 coupled with the message receiver 406, control database 412 and timing logic 414, which may be implemented as first logic or other computer executable program code 408 stored in the memory 402 and configured to be executed by the processor 404, or otherwise operative to process each data message as it is received by the message receiver 406, i.e., in real time with respect to the order in which the data messages are received, and process the data message as described herein. In particular, wherein if a received message comprises a market data message, the local market data publisher 124A, 124B, 124n accesses its local copy of the control database 412 to determine to which participants to send the market data message, in what form and when. The local market data publisher 124A, 124B, 124n then transmits the received market data message accordingly. If the message received from the base market data distributor module 122 is an update to the control database, e.g., a change to credit relationships, preferences, subscriptions, etc., the local market data publisher 124A, 124B, 124n updates its copy of the control database accordingly, such that any changes will be applied to subsequently received market data messages. If the message received from the base market data distributor module 122 is a timing message, the local market data publisher 124A, 124B, 124n utilizes that information for determining when to transmit deferred/delayed market data messages, such as by updating/synchronizing internal timing logic 414, and may further utilize the timing messages to reconcile internal message transmission queues or otherwise confirm deterministic operation with respect to the order in which market data messages are received. The message processor 408, based on the control data from the control database 412 may create different versions of a particular market data message for different participants, e.g., having a different form. For delayed/deferred messages, the message processor may store the market data message in a buffer or other storage for later transmission as described. In one embodiment, the message processor 408 may be configured with standardized/default parameters for which recipients will receive a given market data message, in what form and when, to apply when a particular parameter is not defined by the data in the control database. For example, where no control data for a particular participant exists for defining in what form to send the market data message, or when to send it, the message processor 408 may use a default message form and send the message upon receipt.

The local market data publisher 124 further includes a message transmitter 410 coupled with the message processor 408 and the local area sub-network 416 (160), which may be implemented as first logic or other computer executable program code 410 stored in the memory 402 and configured to be executed by the processor 404, or otherwise operative to transmit the received market data messages, re-formed or otherwise, deferred or otherwise, to one or more of the participants as directed. In this manner, customized market data streams may be generated for various participants while other participants receive a standard market data stream.

The base market data distributor 122 and/or local market data publishers 124 may be implemented as one or more separate components or as one or more logic components, e.g. first through fifth logic 306-314, first through third logic 406-410, such as on an FPGA that may include a memory or reconfigurable component to store logic and processing component to execute the stored logic, or as computer program logic, stored in the memory 302, 402, or other non-transitory computer readable medium, and executable by a processor 304, 404, such as the processor 202 and memory 204 described below with respect to FIG. 2, to cause the processor 404 to, or otherwise be operative to, implement the above described operations.

Referring to FIG. 5, there is shown a system/architecture 500 for communicating, e.g., optimizing communication/distribution of customized and non-customized electronic market data to a plurality of participants 504, physically/geographically and/or logically distributed, from an electronic trading system 100 via an electronic communications network 506, 508.

As was described, the system 500 includes a plurality of data publishers 124 coupled with a transaction processor 100 (106), the transaction processor 100 (106) operative to generate, as the transaction processor 100 (106) processes each of a plurality of incoming electronic transaction messages received from any of the plurality of participants 508, transaction event data indicative thereof and transmit electronic data messages comprising the transaction event data to each of the plurality of data publishers 124, each of the plurality of data publishers 124 being further coupled with at least a subset of the plurality of participants 508 so as to be able to transmit market event data thereto and further comprising a control database 412 which stores data operative to control, i.e., to whom, when and in what form, the transmission of transaction event data to at least the subset of the plurality of participants 508 coupled therewith;

Each of the plurality of data publishers 124 is operative to receive a data message from the transaction processor 100 (106), the received data message comprising data indicative of one of transaction event data, a modification to the data stored in the control database, or timing information indicative of a relationship between previously received transaction event data or data indicative of a modification to the data stored in the control database 412 and subsequently received transaction event data or data indicative a modification to the data stored in the control database 412.

Each of the plurality of data publishers 124 is further operative, upon receipt of the data message, to perform an action comprising: when the received data message comprises a modification to the data stored in the control database 412, update the data stored in the control database 412 in accordance therewith; and when the received data message comprises transaction event data, determine, based on the data currently stored in the control database 412, a subset, e.g., all participants, all those connected to the particular data publisher 124, or none of the participants, of the plurality of participants to which to transmit the transaction event data and when, e.g., immediately or delayed/deferred, to transmit the transaction event data thereto, as well as the form thereof for each participant of the subset, and transmit the transaction event data to the determined subset of the plurality of participants when determined, and in the determined form.

Wherein all of the plurality of data publishers 124 perform a same action upon receipt of a same data message in a same relationship to a previously performed action which was performed based on a previously received data message.

In one embodiment, the transaction processor 100 (106) is located, e.g., physically and/or geographically, closer to one of the plurality of data publishers 124 than all of the others of the plurality of data publishers 124, where, for example, each data publisher 124 is located in a particular geographic region. In one embodiment, the closer data publisher 124 receives the data message from transaction processor 100 (106) before the others of the plurality of data publishers 124, the closer data publisher 124 thereby performing the action based thereon before the others of the plurality of data publishers 124.

In one embodiment, each of the data publishers 124 is coupled with at least a subset of the plurality of participants 504 via a lower cost network 508, or otherwise lower speed/higher latency network 508, and the transaction processor 100 (106) is coupled with at least a subset of the data publishers 124 via, as at least compared to network 508, a higher cost network 506, or otherwise higher speed/lower latency network 506.

In one embodiment, the transaction processor 100 (106) is further operative to transmit, to the plurality of data publishers 124, the data messages comprising the data indicative of a modification to the data stored in the control database 412 or the timing information.

In one embodiment, wherein the data stored in the control database 412 of each of the plurality of data publishers 124 comprises, for each of at least the subset of participants 504, data indicative of a relationship, e.g. a credit relationship, between the participant 504 and one or more of the others of the plurality of participants 504, the determination of the subset of the plurality of participants 504 to which to transmit the transaction event data further comprising a determination of which of the plurality of participants 504 have a relationship with the participant from whom the electronic transaction message was received for which the transaction event data of the received data message is indicative according to the control database 412 at the time of the determination. In one embodiment, the modification to the data stored in the control database 412 comprises an update to at least one relationship between at least two of the plurality of participants 504.

In one embodiment, the data stored in the control database 412 of each of the plurality of data publishers 124 comprises, for each of at least the subset of participants 504, data indicative of one or more criteria, e.g., preferences, such as particular products, threshold values, or subscription, such as real time vs delayed market data, the identify of particular publisher that the participant wants to get their data from, associated with the participant 504. In one embodiment, the lack of any criteria in the database 412 for a given participant may trigger default handling, such as send all data immediately in a default form, or send no data. In one embodiment, the determination of the subset of the plurality of participants 504 to which to transmit the transaction event data further comprises a determination of whether the transaction event data of the received data messages satisfies the one or more criteria of each of the plurality of participants 504. In one embodiment, the determination of when, e.g., immediately upon receipt or delayed/deferred based on a subscription level, to send the transaction event data to each of the determined subset of the plurality of participants 504 is based on the one or more criteria associated therewith.

In one embodiment, the system 500 further determines in what form, e.g., custom, MBO, MBP, etc., to send the transaction event data to each of the determined subset of the plurality of participants 504 based on the one or more criteria associated therewith.

In one embodiment, the determination of when, e.g., immediately upon receipt or delayed/deferred, to send the transaction event data to each of the determined subset of the plurality of participants is based on the received, e.g., prior or subsequent to the receipt of the transaction event data, timing information, the transaction event data being transmitted to the determined subset of the plurality of participants 504 relative thereto.

In one embodiment, the transaction event data may indicate that it is embargoed and for how long, e.g., relative to the most recent prior or subsequent heartbeat message.

In one embodiment, the transaction processor 100 comprises a match engine 106 of an electronic trading system.

In one embodiment, the timing information comprises a heartbeat message.

Figure 6:
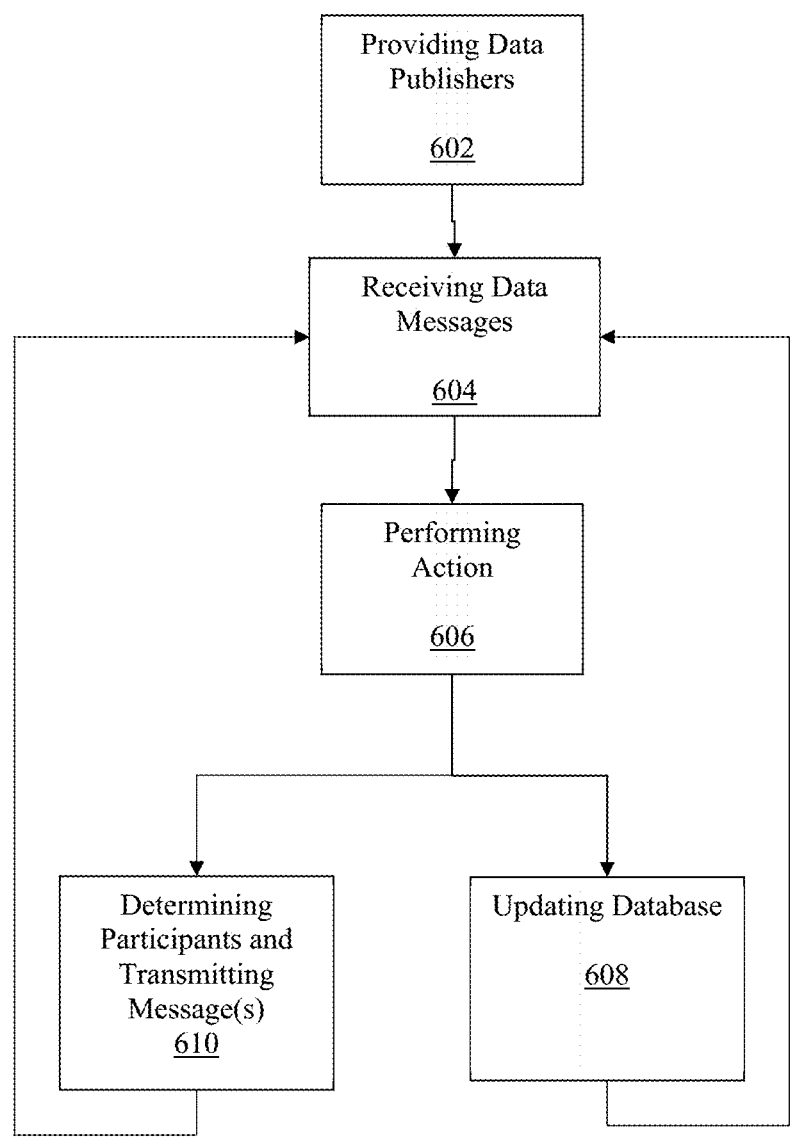
FIG. 6 illustrates an example flowchart showing example operation of the system of FIGS. 1-5.

In one embodiment, the transaction event data comprises order acknowledgements and trade executions FIG. 6 illustrates an example flowchart 600 of the operation of the system 500 for communicating, e.g., optimizing communication/distribution of customized and non-customized electronic market data to a plurality of participants 504, physically/geographically and/or logically distributed, from an electronic trading system 100 via an electronic communications network 506, 508. In one embodiment, the operation of the system 500 includes: providing a plurality of data publishers 124 coupled with a transaction processor 100 (106), the transaction processor 100 (106) operative to generate, as the transaction processor 100 (106) processes each of a plurality of incoming electronic transaction messages received from any of the plurality of participants 504, transaction event data indicative thereof and transmit electronic data messages comprising the transaction event data to each of the plurality of data publishers 124, each of the plurality of data publishers 124 being further coupled with at least a subset of the plurality of participants 504 so as to be able to transmit market event data thereto and further comprising a control database 412 which stores data operative to control, i.e., to whom, when and in what form, the transmission of transaction event data to at least the subset of the plurality of participants 504 coupled therewith (Block 602); receiving, by each of the plurality of data publishers 124, a data message from the transaction processor 100 (106), the received data message comprising data indicative of one of transaction event data, a modification to the data stored in the control database 412, or timing information indicative of a relationship between previously received transaction event data or data indicative of a modification to the data stored in the control database 412 and subsequently received transaction event data or data indicative a modification to the data stored in the control database 412 (Block 604); performing, by each of the plurality of data publishers 124 upon receipt of the data message, an action comprising (Block 606): when the received data message comprises a modification to the data stored in the control database 412, updating the data stored in the control database 412 in accordance therewith (Block 608); and when the received data message comprises transaction event data, determining, based on the data currently stored in the control database 412, a subset, e.g., all participants, all those connected to the particular data publisher 124, or none of the participants, of the plurality of participants to which to transmit the transaction event data and when, e.g., immediately or delayed/deferred, to transmit the transaction event data thereto, as well as the form thereof for each participant of the subset, and transmitting the transaction event data to the determined subset of the plurality of participants when determined, and in the determined form (Block 610); and wherein all of the plurality of data publishers perform a same action upon receipt of a same data message in a same relationship to a previously performed action which was performed based on a previously received data message.

CONCLUSION

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72 (b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

The invention claimed is:

1. A system comprising:
an electronic data publisher coupled with a transaction processor so as to receive data messages generated thereby and a plurality of participants so as to be able to transmit the data messages thereto;
the electronic data publisher being further operative to receive a data message from the transaction processor, the received data message comprising data indicative of:
a transaction event,
a modification to which of the plurality of participants to send which data messages and when to send the data messages thereto, or
a temporal reference;
the electronic data publisher being further operative, upon receipt of the data message, to:
when the received data message comprises data indicative of a modification to which of the plurality of participants to send which data messages and when to send the data messages thereto, modify the operation of the electronic data publisher in accordance therewith; and
when the received data message comprises data indicative of a transaction event, determine a subset comprising which of the plurality of participants coupled with the electronic data publisher to which to transmit the received data message and at what time to transmit the received data message thereto, and transmit the received data message to the determined subset of participants at the determined time; and
wherein the electronic data publisher processes received data messages identically to another electronic data publisher coupled with a different plurality of participants that is in receipt of a same data message in a same relationship to a previously performed action which was performed based on the processing of a previously received data message regardless of whether or not the electronic data publishers contemporaneously receive the same data messages.

2. The system of claim 1, wherein the other electronic data publisher, when the received data message comprises data indicative of a transaction event, determines a different subset comprising which of the plurality of participants coupled with the electronic data publisher to which to transmit the received data message and at what time to transmit the received data message thereto, and transmits the received data message to the determined different subset of participants at the determined time.

3. The system of claim 1, wherein the electronic data publisher is located in a different geographic region than another electronic data publisher.

4. The system of claim 1, wherein the electronic data publisher receives the data message from transaction processor before another electronic data publisher, the electronic data publisher thereby performing the action based thereon before the other electronic data publisher.

5. The system of claim 1, wherein the transaction processor is further operative to transmit, to the electronic data publisher, the data messages comprising the data indicative of the modification to which of the plurality of participants to send which data messages and when to send the data messages thereto, or the temporal reference.

6. The system of claim 1, wherein the determination of at what time to send the transaction event data to each of the determined subset of participants is based on the received temporal reference, the transaction event data being transmitted to the determined subset of participants relative thereto.

7. The system of claim 1, wherein the transaction event may include data indicative of the data message being embargoed and for how long.

8. The system of claim 1, wherein the data indicative of temporal reference further includes command data configured to control the electronic data publisher.

9. The system of claim 1, further comprising a control database which stores data operative to control communication with one or more of the plurality of participants coupled therewith, the data indicative of the modification being used to update the control database.

10. The system of claim 9, wherein the data stored in the control database of the electronic data publisher comprises, for each of the subset of participants, data indicative of a relationship between the participant and one or more of the others of the plurality of participants, the determination of the subset of the participants to which to transmit the transaction event data further comprising a determination of which of the plurality of participants have a relationship with the participant from whom the electronic transaction message was received for which the transaction event data of the received data message is indicative according to the control database at the time of the determination.

11. The system of claim 9, wherein the data stored in the control database of the electronic data publisher comprises, for each of at least the subset of participants, data indicative of one or more criteria associated with the participant specifying what transaction event data they want to receive.

12. The system of claim 9, wherein the data stored in the control database further defines a form in which to transmit the transaction event data to the determined subset of participants, the form comprising a selection of data fields of the transaction event data to transmit, an order in which the selected data fields are to be transmitted, additional derivations or computations to include, or combinations thereof.

13. The system of claim 9, wherein the data stored in the control database defines one or more credit relationships between subsets of participants, the transaction event data being transmitted only to those of the plurality of participants who have a credit relationship with a participant whose incoming electronic transaction message caused the transaction processor to generate the transaction event data.

14. The system of claim 9, wherein the data stored in the control database defines, for at least a subset of participants, whether to transmit the transaction event data thereto immediately upon receipt by the electronic data publisher or after expiration of a time period subsequent to receipt by the electronic data publisher, the determination of at what time to transmit the transaction event data being based thereon.

15. The system of claim 9, wherein the data stored in the control database defines when to transmit the transaction event data relative to an event or at a specific time.

16. The system of claim 1, wherein the transaction processor comprises a match engine of an electronic trading system.

17. A computer implemented method comprising:
receiving data messages from a transaction processor by a processor of an electronic data publisher coupled with the transaction processor so as to receive the data messages generated thereby and with a plurality of participants so as to be able to transmit the data messages thereto, wherein the received data message comprising data indicative of:
a transaction event,
a modification to which of the plurality of participants to send which data messages and when to send the data messages thereto, or
a temporal reference;
the method further comprising:
modifying, by the processor when the received data message comprises data indicative of a modification to which of the plurality of participants to send which data messages and when to send the data messages thereto, the operation of the electronic data publisher in accordance therewith; and
determining, by the processor when the received data message comprises data indicative of a transaction event, a subset comprising which of the plurality of participants coupled with the electronic data publisher to which to transmit the received data message and at what time to transmit the received data message thereto, and transmitting the received data message to the determined subset of participants at the determined time; and
wherein the electronic data publisher processes received data messages identically to another electronic data publisher coupled with a different plurality of participants that is in receipt of a same data message in a same relationship to a previously performed action which was performed based on the processing of a previously received data message regardless of whether or not the electronic data publishers contemporaneously receive the same data messages.

18. The computer implemented method of claim 17, further comprising determining, by the other electronic data publisher, when the received data message comprises data indicative of a transaction event, a different subset comprising which of the plurality of participants coupled with the electronic data publisher to which to transmit the received data message and at what time to transmit the received data message thereto, and transmitting by the other electronic data publisher the received data message to the determined different subset of participants at the determined time.

19. The computer implemented method of claim 17, wherein the electronic data publisher is located in a different geographic region than another electronic data publisher.

20. The computer implemented method of claim 17, wherein the electronic data publisher receives the data message from transaction processor before another electronic data publisher, the electronic data publisher thereby performing the action based thereon before the other electronic data publisher.

21. The computer implemented method of claim 17, wherein the transaction processor is further operative to transmit, to the electronic data publisher, the data messages comprising the data indicative of the modification to which of the plurality of participants to send which data messages and when to send the data messages thereto, or the temporal reference.

22. The computer implemented method of claim 17, wherein the determination of at what time to send the transaction event data to each of the determined subset of participants is based on the received temporal reference, the transaction event data being transmitted to the determined subset of participants relative thereto.

23. The computer implemented method of claim 17, wherein the transaction event may include data indicative of the data message being embargoed and for how long.

24. The computer implemented method of claim 17, wherein the data indicative of temporal reference further includes command data configured to control the electronic data publisher.

25. The computer implemented method of claim 17, further comprising storing, in a control database coupled with the electronic data publisher, data operative to control communication with one or more of the plurality of participants coupled therewith, the data indicative of the modification being used to update the control database.

26. The computer implemented method of claim 25, wherein the data stored in the control database of the electronic data publisher comprises, for each of the subset of participants, data indicative of a relationship between the participant and one or more of the others of the plurality of participants, the determination of the subset of the participants to which to transmit the transaction event data further comprising a determination of which of the plurality of participants have a relationship with the participant from whom the electronic transaction message was received for which the transaction event data of the received data message is indicative according to the control database at the time of the determination.

27. The computer implemented method of claim 25, wherein the data stored in the control database of the electronic data publisher comprises, for each of at least the subset of participants, data indicative of one or more criteria associated with the participant specifying what transaction event data they want to receive.

28. The computer implemented method of claim 25, wherein the data stored in the control database further defines a form in which to transmit the transaction event data to the determined subset of participants, the form comprising a selection of data fields of the transaction event data to transmit, an order in which the selected data fields are to be transmitted, additional derivations or computations to include, or combinations thereof.

29. The computer implemented method of claim 25, wherein the data stored in the control database defines one or more credit relationships between subsets of participants, the transaction event data being transmitted only to those of the plurality of participants who have a credit relationship with a participant whose incoming electronic transaction message caused the transaction processor to generate the transaction event data.

30. The computer implemented method of claim 25, wherein the data stored in the control database defines, for at least a subset of participants, whether to transmit the transaction event data thereto immediately upon receipt by the electronic data publisher or after expiration of a time period subsequent to receipt by the electronic data publisher, the determination of at what time to transmit the transaction event data being based thereon.

31. The computer implemented method of claim 25, wherein the data stored in the control database defines when to transmit the transaction event data relative to an event or at a specific time.

32. The computer implemented method of claim 17, wherein the transaction processor comprises a match engine of an electronic trading system.

33. A system comprising:
- means for receiving data messages from a transaction processor by an electronic data publisher coupled with the transaction processor so as to receive the data messages generated thereby and with a plurality of participants so as to be able to transmit the data messages thereto, wherein the received data message comprising data indicative of:
  - a transaction event,
  - a modification to which of the plurality of participants to send which data messages and when to send the data messages thereto, or
  - a temporal reference;

the system further comprising:
- means for modifying, when the received data message comprises data indicative of a modification to which of the plurality of participants to send which data messages and when to send the data messages thereto, the operation of the electronic data publisher in accordance therewith; and
- means for determining, when the received data message comprises data indicative of a transaction event, a subset comprising which of the plurality of participants coupled with the electronic data publisher to which to transmit the received data message and at what time to transmit the received data message thereto, and transmitting the received data message to the determined subset of participants at the determined time; and wherein the electronic data publisher processes received data messages identically to another electronic data publisher coupled with a different plurality of participants that is in receipt of a same data message in a same relationship to a previously performed action which was performed based on the processing of a previously received data message regardless of whether or not the electronic data publishers contemporaneously receive the same data messages.

* * * * *